Figure 1:
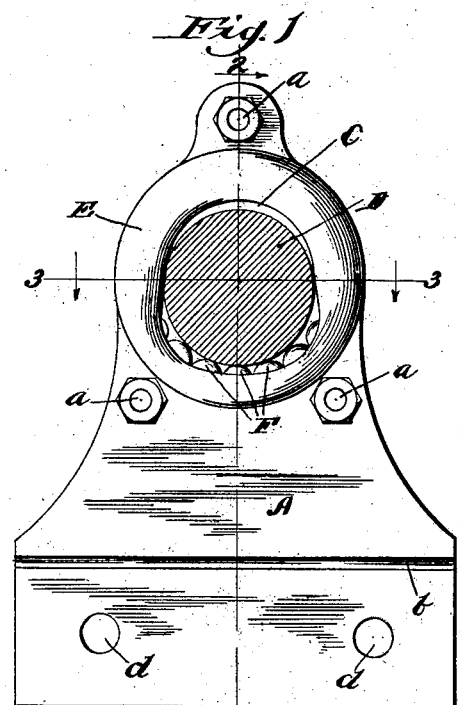

No. 694,043. Patented Feb. 25, 1902.
G. WIDEMAN.
SHAFT BEARING.
(Application filed Aug. 26, 1901.)
(No Model.)

Witnesses
Ira D. Perry
J B Weir

Inventor
Gustavus Wideman
by Bond, Adams, Pickard & Jackson
Att'ys

THE NORRIS PETERS CO., PHOTO-LITHO., WASHINGTON, D. C.

UNITED STATES PATENT OFFICE.

GUSTAVUS WIDEMAN, OF AURORA, ILLINOIS, ASSIGNOR TO WILCOX MANUFACTURING COMPANY, OF AURORA, ILLINOIS, A CORPORATION OF ILLINOIS.

SHAFT-BEARING.

SPECIFICATION forming part of Letters Patent No. 694,043, dated February 25, 1902.

Application filed August 26, 1901. Serial No. 73,374. (No model.)

*To all whom it may concern:*

Be it known that I, GUSTAVUS WIDEMAN, a citizen of the United States, residing at Aurora, in the county of Kane and State of Illinois, have invented certain new and useful Improvements in Shaft-Bearings, of which the following is a specification, reference being had to the accompanying drawings.

This invention relates to improvements in bearings for shafts, and is designed particularly for use in connection with comparatively small machines, which are ordinarily sold and delivered in a more or less "knockdown" condition. It is always desirable to have such machines equipped with antifriction devices; but in the ordinary form in which ball-bearings are furnished the owner of the machine, owing to inexperience in the setting up of the same, in many cases finds it very difficult to retain in place the small steel balls constituting the shaft-bearing while adjusting the shaft in place.

The object of my invention is to provide a device in which such steel balls will be retained at all times and which will permit the shaft intended to be employed in connection therewith to be readily and quickly inserted in or withdrawn from the bearing and which will when inserted bear upon the exposed surfaces of the required number of balls to insure the proper action of the series of balls as a perfect bearing. I accomplish this object by the means shown in the drawings and hereinafter described.

Figure 2:
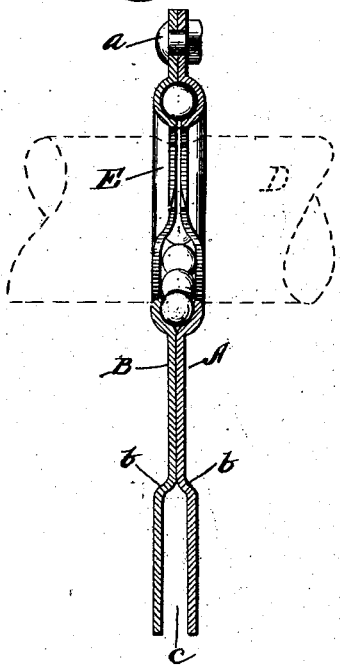
Figure 3:
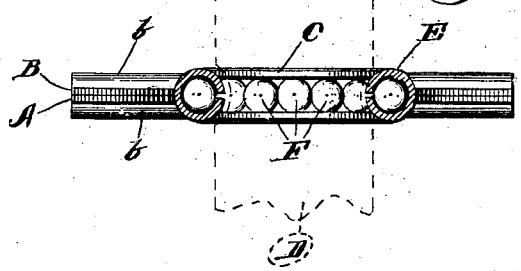
Figure 4:
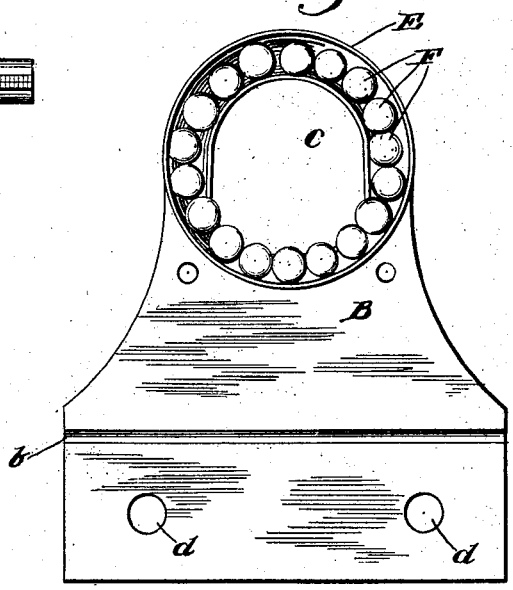

In the accompanying drawings, Figure 1 is a side elevation of the bearing, a shaft therein being shown in section. Fig. 2 is a vertical section at line 2 2 of Fig. 1. Fig. 3 is a cross-section at line 3 3 of Fig. 1, a shaft being indicated in this figure and in Fig. 2 in dotted lines; and Fig. 4 is an elevation with one of the frame-plates removed.

Referring to said drawings, A B indicate two correspondingly-shaped plates constituting the bearing-frame, these plates being when the device is complete firmly secured together by bolts *a* or in any other suitable manner. Through the frame A B and near the upper portion thereof, in the form of construction shown, is an oval-shaped opening C for the passage of a shaft, as D, that is designed to be supported by the device. Around this opening C the metal of each plate A B is forced outward to form one-half of a channel of suitable shape for a series of steel balls of the desired size to freely move in, the said channel being complete, as shown, when the two plates A B are secured together. This channel is indicated by E, and the series of balls adapted to move therein is indicated by F. At the lower side of the opening C the channel E is so formed as to leave exposed a sufficient number of the series of balls F to afford a full bearing for the shaft; but even with the shaft removed the balls cannot escape from the channel, for, as will be seen from the drawings, the inturned inner edges of the channel, where the balls are exposed, are sufficiently above the centers of the balls to retain the balls at all times within the channel. This opening for the exposure of the balls for the purpose stated diminishes until at a point varying from one-third to one-half the diameter of the shaft the inner edges of the two parts forming the channel are brought close together, forming a substantially closed channel in which the balls are free to move. The shaft where it engages the balls is to be provided with the usual groove, which is indicated in the dotted representation of a shaft that is shown in Figs. 2 and 3, and this, with the weight carried by the shaft, insures the retention of the shaft properly on the series of balls. By reason of the opening C being of slightly greater diameter vertically than horizontally it will be understood that the shaft can be disengaged from its bearing and removed or placed therein without any necessity for disturbing the relation of the other parts to each other.

The lower portions of the plates A B are in the construction shown provided with shoulders *b*, whereby a space *c* is left between the lower portions of the plates to adapt the device to be placed over a part of the framework of the machine on which it is used and there bolted in place by bolts passing through holes *d*. Other means of attachment could of course be employed to adapt it to machines of different kinds.

The bearing shown and described is very cheap and simple in construction, the two plates A B, with their respective halves of the channel E, being by the use of suitable dies readily stamped out of sheet metal, after which the channel is to be filled with the series of balls and the plates then secured together. The device as a whole in condition for application to a machine can be readily applied by unskilled labor to the grindstone or other machine for which it is intended, and the annoyance and loss of time incident to the application to such a machine of the usual ball-bearings when the same are shipped separate from the shafts is entirely obviated.

That which I claim as my invention, and desire to secure by Letters Patent, is—

1. In a ball-bearing, the combination with two plates having a shaft-opening therein of greater diameter vertically than horizontally, each of said plates having formed therein around said opening a half of a channel, of a series of balls in said channel, said balls being exposed in the lower portion of said channel, and means for holding said plates together, substantially as specified.

2. In a ball-bearing, the combination with two plates, of means for holding said plates together, an opening through the plates of greater diameter vertically than horizontally, a channel formed on the inner faces of said plates and around said opening, and a series of balls in said channel, said channel being open on the upper portion of its lower side to permit the balls to project to form a bearing for a shaft passing through said opening, and the edges of the channel opposite the exposed balls being turned in toward the balls and above their centers, substantially as specified.

GUSTAVUS WIDEMAN.

Witnesses:
D. W. SIMPSON,
W. S. FERRIS.